(12) United States Patent
Li et al.

(10) Patent No.: US 7,974,994 B2
(45) Date of Patent: Jul. 5, 2011

(54) SENSITIVE WEBPAGE CONTENT DETECTION

(75) Inventors: Ying Li, Bellevue, WA (US); Teresa Mah, Bellevue, WA (US); Jie Tong, Beijing (CN); Xin Jin, Sammamish, WA (US); Saleel Sathe, Sammamish, WA (US); Jingyi Xu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 319 days.

(21) Appl. No.: 11/748,249

(22) Filed: May 14, 2007

(65) Prior Publication Data
US 2008/0320010 A1 Dec. 25, 2008

(51) Int. Cl.
*G06F 7/00* (2006.01)
*G06F 17/30* (2006.01)

(52) U.S. Cl. ...................................................... 707/810

(58) Field of Classification Search ............... 707/1–10, 707/100–104.1; 709/225
See application file for complete search history.

(56) References Cited

U.S. PATENT DOCUMENTS

| | | | |
|---|---|---|---|
| 6,606,652 B1 | 8/2003 | Cohn et al. | |
| 7,124,093 B1 | 10/2006 | Graham et al. | |
| 2004/0015586 A1* | 1/2004 | Hegli et al. | 709/225 |
| 2004/0034559 A1 | 2/2004 | Harris et al. | |
| 2005/0165615 A1 | 7/2005 | Minar | |
| 2005/0165766 A1* | 7/2005 | Szabo | 707/3 |
| 2006/0085392 A1 | 4/2006 | Wang et al. | |
| 2006/0106710 A1 | 5/2006 | Meek et al. | |
| 2006/0123001 A1 | 6/2006 | Burns | |
| 2006/0259356 A1 | 11/2006 | Zhang et al. | |
| 2006/0259473 A1 | 11/2006 | Li et al. | |
| 2008/0222734 A1* | 9/2008 | Redlich et al. | 726/26 |

FOREIGN PATENT DOCUMENTS

WO WO2006083118 A1 10/2006

OTHER PUBLICATIONS

Microsoft Adcenter Labs, "Detecting Sensitive Webpages," http://adlab.msn.com/Sensitive/Default.aspx, p. 1.
Submissions/Press Releases, "Moreover Technologies Announces Intelligent Delivery of Contextual Advertising In Free RSS News Feeds," Sep. 29, 2004, http://www.w3reports.com.
Adhoc Mobile, "Developers & Publishers," http://www.adhocmobile.com/publishers.html.
Philippe Mathonnet (IDATE), Stefano Lamborghini (AIIP), & Mario Martinoli (Databank Consulting), Prepact Review of European Third-party filtering and rating software & services (Lot 3), Final Report—vol. 1, for the Attention of EC DGXIII, Dec. 1999, pp. 1-66, http://curopa.eu.int/ISPO/iap/IDATEreport1.doc.

* cited by examiner

*Primary Examiner* — Hosain T Alam
*Assistant Examiner* — Navneet K Ahluwalia
(74) *Attorney, Agent, or Firm* — Shook Hardy & Bacon LLP (57) ABSTRACT

Computer-readable media, systems, and methods for sensitive webpage content detection are described. In embodiments, a multi-class classifier is developed and one or more webpages with webpage content are received. In various embodiments, the one or more webpages are analyzed with the multi-class classifier and, in various embodiments, a sensitivity level is predicted that is associated with the webpage content of the one or more webpages. In various other embodiments, the multi-class classifier includes one or more sensitivity categories.

8 Claims, 5 Drawing Sheets

SENSITIVE WEBPAGE CONTENT DETECTION

BACKGROUND

Online advertising has advanced beyond an obscure theory and into an extremely viable advertising outlet. Advertisers are willing to invest huge amounts of financial resources in an attempt to reach consumers more effectively. Emerging techniques aim to target advertisements to specific interest groups of potential customers. For instance, content-based advertising analyzes the content of a webpage that a particular online user is interacting with and, based upon the content of the webpage, directs advertisements to the online user. Basically, when an online user visits a webpage, a content-based advertising system will extract key terms or phrases from the page and deliver relevant advertisements to the online user in real-time. As an example, a content-based advertising system may intend to direct sports utility vehicle (SUV) advertisements to users reading about SUVs. Wherever the term SUV exists within the content of a webpage, the content-based advertising system is able to deliver a targeted SUV advertisement to the online user.

Unfortunately, some webpages include sensitive content that traditional content-based advertising systems are ill-suited to account for, causing the advertising system to deliver relevant but undesired advertisements, adversely affecting an advertiser's campaign. More specifically, content-based advertising systems lack an effective sensitivity measure that will intercept advertisements where they may be inappropriate. An effective sensitivity measure may also allow for specifically directed advertising opportunities in some circumstances that have thus-far not been taken advantage of. For example, where an online user is reading a news article about a recall of a particular automaker's SUVs, content-based advertising systems might recognize the term SUV in the article and display an advertisement for the recalling automaker. It would be extremely valuable for an automaker to avoid such an embarrassingly inappropriate advertisement. A competitor automaker may also consider it quite valuable to direct one of its own advertisements to an online user reading such an article. The exemplary deficiencies of content-detection techniques are not limited to an automobile context. For instance, a beer or liquor manufacturer will likely not want to display an advertisement in an article discussing drunk driving. Similarly, many advertisers may wish to avoid display of advertisements altogether on a webpage appealing to prurient interest. Because of the lack of content sensitivity, however, advertisers miss various lucrative advertising opportunities and advertisers are subject to potentially embarrassing and counter-productive displays of their advertisements.

SUMMARY

Embodiments of the present invention relate to computer-readable media, systems, and methods for sensitive webpage content detection. In embodiments, a multi-class classifier is developed and one or more webpages with webpage content are received. Additionally, in embodiments, the one or more webpages are analyzed with the multi-class classifier. Further, in embodiments, the sensitivity level associated with the webpage content of the one or more webpages is predicted. In embodiments, the multi-class classifier includes sensitivity categories to be associated with the one or more webpages based upon the sensitivity of the content of the one or more webpages.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as simplifying a particular order among or between various steps herein disclosed unless and except when the order of individual steps is explicitly described.

Embodiments of the present invention provide computer readable media, systems, and methods for sensitive webpage content detection. In various embodiments, a multi-class classifier is developed, one or more webpages with webpage content is received and analyzed with the multi-class classifier. Further, in various embodiments, the sensitivity level associated with the webpage content of the one or more webpages is predicted. While embodiments discussed herein refer to communications between system components on a public network such as via the Internet, it will be understood and appreciated by one of ordinary skill in the art that embodiments are not limited to a public network or a particular network type. For example, other embodiments may communicate between components via a private network.

Accordingly, in one aspect, the present invention is directed to a computer-implemented method for sensitive webpage content detection. The method includes developing a multi-class classifier and receiving one or more webpages with webpage content. The method further includes analyzing the one or more webpages with the multi-class classifier.

Further, the method includes predicting a sensitivity level associated with the webpage content of the one or more webpages.

In another aspect, the present invention is directed to a computerized system for sensitive webpage content detection. The system includes an offline module configured to develop a multi-class classifier and an online module configured to analyze one or more webpages including webpage content and further configured to predict a sensitivity level associated with the webpage content of the one or more webpages. Further, the system includes a database for storing information from the offline module and the online module.

In yet another embodiment, the present invention is directed to one or more computer readable media having instructions embodied thereon that, when executed, perform a method for sensitive webpage content detection. The method includes developing a multi-class classifier with one or more sensitivity categories and receiving one or more webpages with webpage content. The method further includes associating the one or more webpages with one or more of the one or more sensitivity categories by computing an association probability between the one or more webpages and the one or more sensitivity categories. Further, the method includes computing a confidence score based upon the association probability between the one or more webpages and the one or more sensitivity categories and predicting a webpage sensitivity.

Having briefly described an overview of embodiments of the present invention, an exemplary operating environment is described below.

Figure 1:
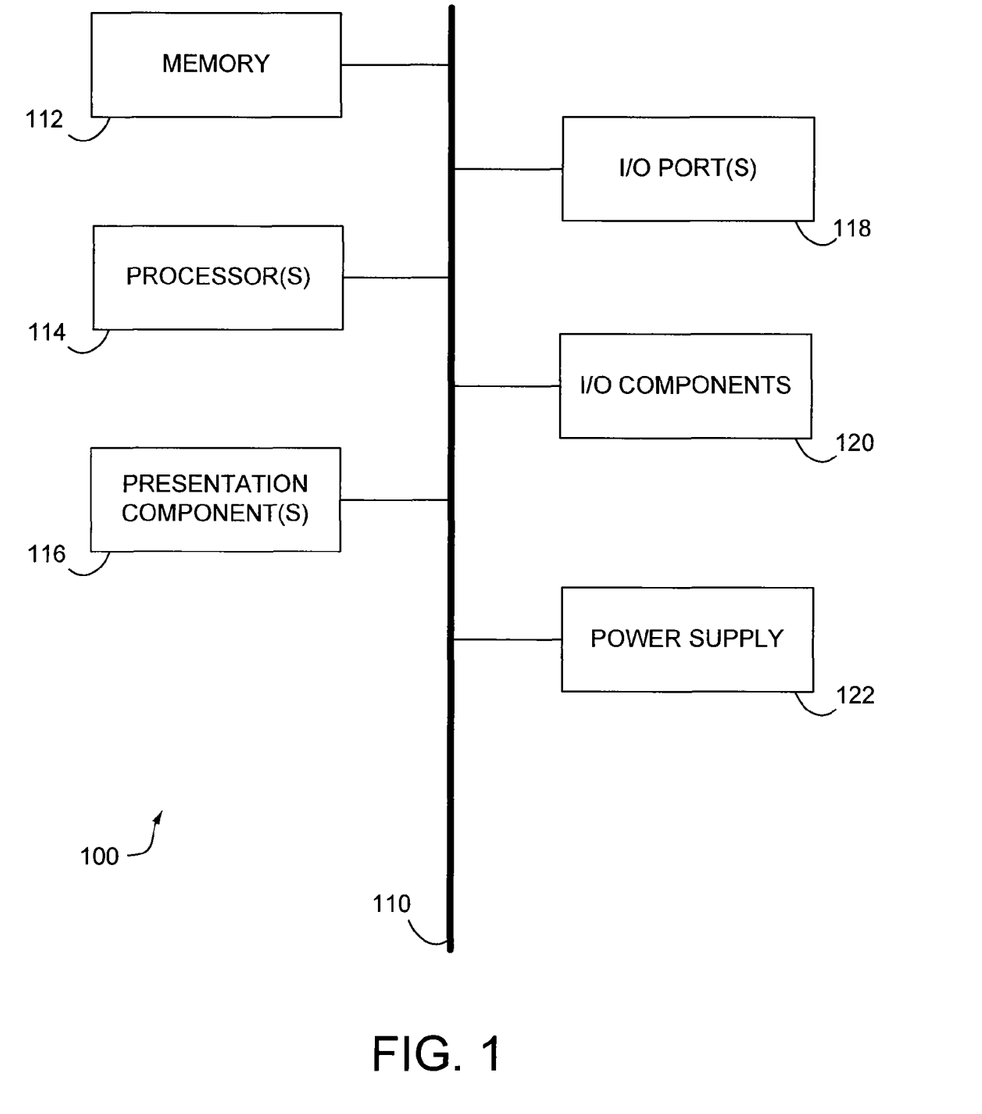
FIG. 1 is a block diagram of an exemplary computing system environment suitable for use in implementing the present invention.

Referring to the drawing figures in general, and initially to FIG. 1 in particular, an exemplary operating environment for implementing embodiments of the present invention is shown and designated generally as computing device 100. Computing device 100 is but one example of a suitable computing environment and is not intended to suggest a limitation as to the scope of use or functionality of the invention. Neither should the computing device 100 be interpreted as having dependency or requirement relating to any one or combination of components illustrated.

Embodiments of the present invention may be described in the general context of computer code or machine-usable instructions, including computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including, but not limited to, hand-held devices, consumer electronics, general purpose computers, specialty computing devices, and the like. Embodiments of the invention may also be practiced in distributed computing environments where tasks are performed by remote processing devices that are linked through a communications network. In a distributed computing environment, program modules may be located in association with both local and remote computer storage media including memory storage devices. The computer useable instructions form an interface to allow a computer to react according to a source of input. The instructions cooperate with other code segments to initiate a variety of tasks in response to data received in conjunction with the source of the received data.

Computing device 100 includes a bus 110 that directly or indirectly couples the following elements: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. Thus, it should be noted that the diagram of FIG. 1 is merely illustrative of an exemplary computing device that may be used in connection with one or more embodiments of the present invention. Distinction is not made between such categories as "workstation," "server," "laptop," "hand held device," etc., as all are contemplated within the scope of FIG. 1 and reference to the term "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or various other mediums that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid state memory, hard drives, optical disc drives, and the like. Computing device 100 includes one or more processors that read from various entities such as memory 112 or I/O components 120. Presentation component(s) 116 present data indications to a user or other device. Exemplary presentation components include a display device, speaker, printing component, vibrating component, and the like.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
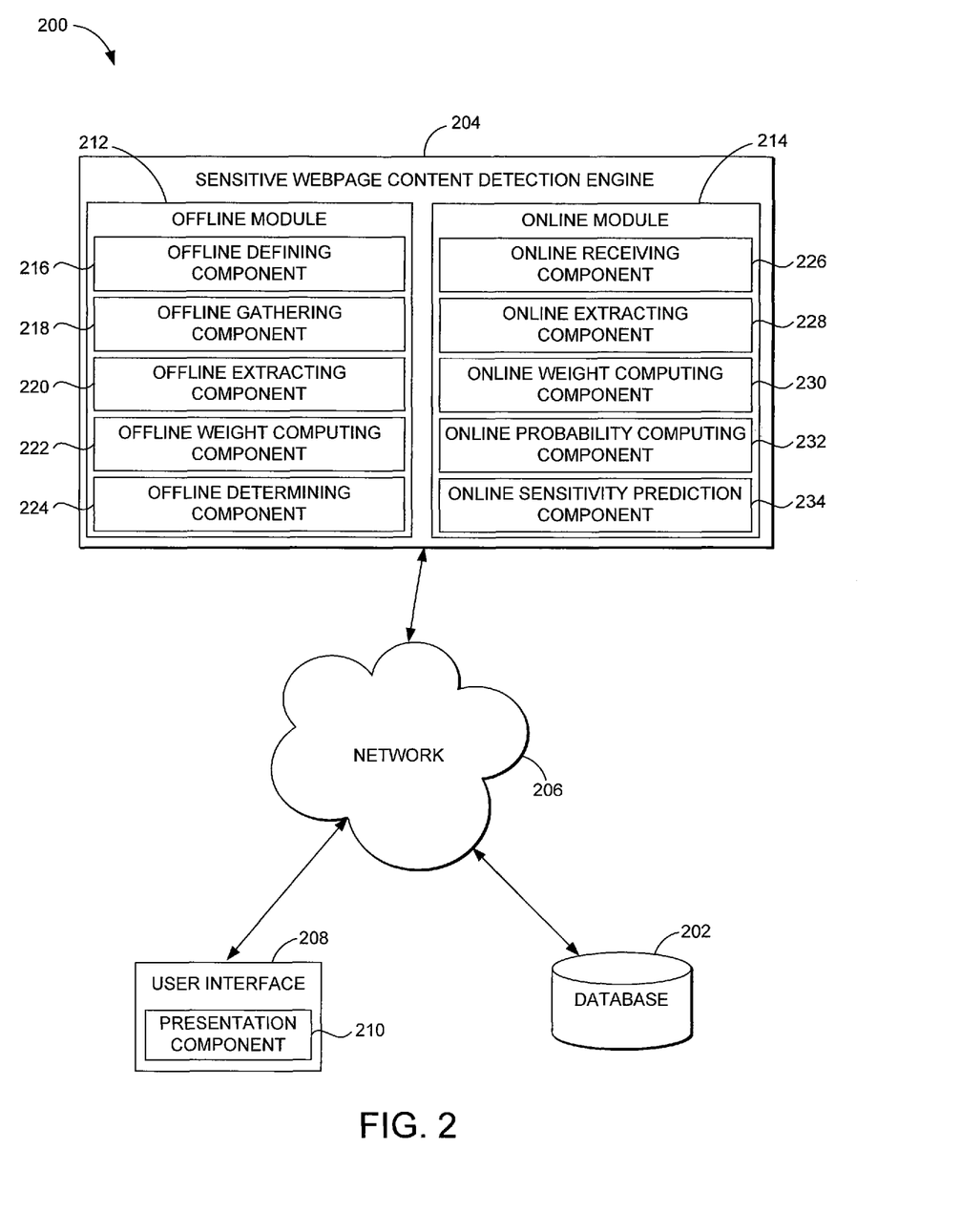
FIG. 2 is a block diagram illustrating an exemplary system for sensitive webpage content detection, in accordance with an embodiment of the present invention.

Turning now to FIG. 2, a block diagram is provided illustrating an exemplary system 200 for sensitive webpage content detection, in accordance with an embodiment of the present invention. The system 200 includes a database 202, a sensitive webpage content detection engine 204, and a user interface 208 in communication with one another via a network 206. Network 206 may include, without limitation, one or more local area networks (LANs) and/or wide area networks (WANs). Such networking environments are commonplace in offices, enterprise-wide computer networks, intranets, and the Internet. Accordingly, network 206 is not further described herein.

Database 202 is configured to store information associated with the sensitive webpage content detection environment. In various embodiments, such information may include, without limitation, sensitivity categories, sensitivity subcategories, multi-class classifier information, webpage information, association information involving webpages and sensitivity categories and subcategories, advertisement information, parental control information, forum information and web-log (hereinafter "blog") information. It will be understood and appreciated by those of ordinary skill in the art that the information stored in database 202 may be configurable and may include various information relevant to sensitive webpage content detection. The content and/or volume of such information are not intended to limit the scope of embodiments of the present invention in any way. Further, though illustrated as a single, independent component, database 202 may, in fact, be a plurality of databases, for instance, a database cluster, portions of which may reside on a computing device associated with sensitive webpage content detection engine 204, associated with user interface 208, on another external computing device (not shown), or any combination thereof.

User interface 208 may be a type of computing device, such as computing device 100 described with reference to FIG. 1, for example, and includes at least one presentation component 210. Presentation component 210 is configured to present (e.g. display) information associated with sensitive webpage content detection engine 204. For example, without limitation, the information may be a news article viewed by an Internet browser, along with advertisement information targeted to the article based upon the content of the article. In this example, without limitation, where the news article includes sensitive content, various advertisements may not be displayed.

Sensitive webpage content detection engine 204 may be a type of computing device, such as computing device 100 described with reference to FIG. 1, and includes an offline module 212 and an online module 214. Further, sensitive webpage content detection engine 204 is configured to operate utilizing at least a portion of the information stored in database 202. In various embodiments, without limitation, sensitive webpage content detection engine 204 may be used, in conjunction with content-based advertising, to determine in real-time whether a webpage contains sensitive content and to determine appropriate advertisements based upon the sensitivity determination. By way of example, without limitation, where content of a webpage involves a recall of a certain automaker's SUVs, sensitive webpage content detection engine 204 may be used to recognize the sensitivity of the webpage content and, in conjunction with content-based advertising, target advertisements for another automaker's SUVs to be displayed on the webpage. As another example, without limitation, where content of a webpage involves a drunk driving incident, sensitive webpage content detection engine 204 may be used to recognize the sensitivity of the webpage content and, in conjunction with content-based advertising, ensure that beer or liquor advertisements are not displayed in association with the webpage. As yet another example, sensitive webpage content detection engine 204 may be used to recognize time-dependent sensitivity that requires customization of an advertisement delivery system to target particular time-sensitive advertisements. For instance, where content of a webpage involves a recent natural disaster, such as shortly after the devastating tsunami in South-East Asia occurred, content engine 204 may be used to recognize the time-sensitive nature of the content and target advertisements, such as relief efforts, for association with the advertisement. As will be understood and appreciated by one of ordinary skill in the art, sensitive webpage content detection engine 204 will have various advertising utilities including, but not limited to, delivering specifically targeted advertisements, delivering time-sensitive advertisements, changing the degree of tolerance depending upon business requirements, and creating a new pricing scheme based upon sensitive webpage content detection.

Further, as will be understood and appreciated by one of ordinary skill in the art, sensitive webpage content detection engine 204 may be used in conjunction with various other applications to enhance functionality. For example, without limitation, sensitive webpage content detection engine 204 may be used in conjunction with a parental control application to provide a control mechanism for the type of content displayed based on a sensitivity determination of webpage content. As another example, without limitation, sensitive webpage content detection engine 204 may be used in conjunction with a blog or forum to control the content of posts submitted by visitors to the blog or forum. Thus, sensitive webpage content detection engine 204 may be used in a variety of capacities in which webpage sensitivity information is desired.

Offline module 212 is configured to develop a multi-class classifier and, in various embodiments, includes an offline defining component 216, an offline gathering component 218, an offline extracting component 220, an offline weight computing component 222, and an offline determining component 224. In various embodiments, without limitation, the offline module 212 develops a multi-class classifier and trains the multi-class classifier before sensitive webpage content detection engine 204 begins using the online module 214. Stated differently, for online module 214 of sensitive webpage content detection engine 204 to function effectively, in various embodiments, offline module 212 may develop and train a multi-class classifier for use with online module 214. The following discussion of the components of offline module 212 are intended for exemplary purposes to demonstrate, in various embodiments, creating a multi-class classifier.

Offline defining component 216 is configured to design a sensitivity definition including one or more sensitivity categories and one or more sensitivity subcategories. In various embodiments, by way of example, offline defining component 216 is flexible and configurable, based upon business needs and customer requirements. For instance, without limitation, offline defining component 216 may create a detailed definition of what will be considered as sensitive and not sensitive. In various embodiments, without limitation, offline defining component 216 may create the following sensitivity categories: sex, accident, crime, human rights/abuse, terrorism and war, weapon, and others. In these embodiments, each sensitivity category except the others category has two subcategories for sensitive and non-sensitive material (e.g. the crime category may have two subcategories: crime—sensitive, and crime—non-sensitive). As will be understood and appreciated by one of ordinary skill in the art, using the categories and subcategories defined by offline defining component 216, sensitive webpage content detection engine 204 may be able to categorize webpages. For instance, without limitation, all pages mentioning sex will be put into the sex category. Inappropriate pages may be subcategorized as sex—sensitive, while pages such as sex education pages may be subcategorized as sex—non-sensitive. Similarly, in various other embodiments, a new page discussing a recently perpetrated crime may be subcategorized as crime—sensitive, while pages discussing crime prevention and safety awareness may be subcategorized as crime—non-sensitive. An exemplary table including various category definitions along with sensitive and non-sensitive subcategories is provided:

SEX: A pornographic webpage is a page containing sexually explicit material of a non-medical and non-scientific nature.
Sex - sensitive:

Sexual relationship counseling or advice
Explicit discussions of sex and sexuality Sexual orientation issues
Nudism
Sex chat rooms
Sex
Thumbnail/picpost sites
Pornographic magazines online
Picture galleries
Pornographic fiction
Phone sex/live video
Adult services; escort services; strippers; professional mistresses
Adult personal ads; adult-themed dating services
Sex toys; marital aids; videos; CD-ROMs; books; fetish clothing;
sex products
Discussions or descriptions of sexual techniques or exercises
Political, legal, or governmental issues relating to pornography
News or journalism about pornography
Literature that touches on sexual themes
Sex - non-sensitive:

Sex education
Disease prevention
Scholarly or journalistic discussion of sex-related topics or themes
Medical discussion of sex, anatomy, sexually-transmitted disease, birth
control, men's and women's health issues
Non-sexual relationship advice
Art nudes
WEAPONS: Weapons pages are those pages which sell, review, or
describe weapons such as guns, knives, or martial arts devices, or
promote information on their use, accessories, or modification.
Weapons - sensitive:

Guns, ammunition, and accessories
Online catalogue of guns, ammunition, and accessories
Online magazines about guns and shooting
Concealed weapon resources
Knives, swords, and other edged weapons
Discount hunting knives, swords, etc.
Fighting knives
Martial arts weaponry
Homemade weapons
Books about how to make guns and other weapons at home
Descriptions of how to build or manufacture guns or ammunition
Weapons - non-sensitive:

Second Amendment/gun rights groups; anti-gun control groups; NRA;
Second Amendment Society; Gun Owners of America
Comparison of American gun laws
Gun control groups and resources; information on gun laws
Historical reproductions
Native American weapons
Society for Creative Anachronism
Scholarly or historical work on weapons and their development,
uses, or manufacturing, including research on specific topics
or weapons
News/journalism about gun or weapon related issues
ACCIDENTS: Accidents pages are pages such as news articles,
analysis, or commentary on events resulting in fatalities.
Accidents - sensitive:

Natural disasters
Vehicle crashes
Household accidents
Accidents - non-sensitive:

Minor injuries
Non-fatal, major injuries
Sports injuries
Natural disaster preparedness
Injury prevention and precautions
Injury treatment
CRIME: Crime pages are pages such as news articles,
analysis, or commentary on illegal activity.
Crime - sensitive:

Arson
Assault
Battery
Blackmail
Burglary
Child abuse

Counterfeiting
Drug possession
Embezzlement
Espionage
Extortion
Forgery
Fraud/deception
Homicide
Identity theft
Illegal gambling
Inchoate offenses
Kidnapping
Larceny
Looting
Motor vehicle theft
Perjury
Rape
Robbery
Sexual assaults
Smuggling
Stalking
Tax evasion
Theft
Trespass
Vandalism
Weapon possession
Molestation
Torture
Crime - non-sensitive:

Crime prevention
Precautions against crime
HUMAN RIGHTS ABUSE: Human rights abuse pages are pages such
as news articles, analysis, or commentary on human rights abuse.
Human rights abuse - sensitive:

Human rights violations
Molestation
Rape
Torture
Abuse
Massacre
Genocide
Slavery
Human rights abuse - non-sensitive:

Geneva Convention
Human rights monitoring
TERRORISM AND WAR: Terrorism and war pages are pages such as
news articles, analysis, or commentary on terrorism and war includ-
ing anti-social pages that advocates or provides instructions
for political violence, social threats, and coordinated attacks. A
sensitive war pate is a site which promotes or otherwise encourages
waging war for causing harm to civilians or property.
Terrorism and war - sensitive:

Weapons of mass destruction
Bombs
Hostage-taking
Torture
Abuse
Massacre
Genocide
Incidents
Violence
Weapons and ammunition
Prisoners of war
Death
Terrorism and war - non-sensitive:

Military uniforms
Military strategy
Military history
Historic battlefields
Military figures
Military bands
Enrolling in the armed forces
Reserve forces The above discussion is intended for exemplary purposes only and embodiments of the present invention are not limited to a particular sensitivity category and sensitivity subcategory configuration and various embodiments may include additional categories and subcategories. Additionally, various embodiments may not include each of the categories and subcategories mentioned in the exemplary discussion above. All such combinations and permutations of category and subcategory configurations are contemplated and within the scope of the present invention. The categorization of specific webpages will be discussed in more detail herein with regard to various other components of the sensitive webpage content detection engine 204.

Offline gathering component 218 is configured to gather one or more training webpages. In various embodiments, without limitation, offline gathering component will collect sample webpages from the Internet and place each webpage into corresponding sensitivity categories and sensitivity subcategories. For example, without limitation, to obtain crime prevention related training webpages, a query may be submitted to a search engine and the top 500 ranked webpages may be collected. In various embodiments, without limitation, human reviewers may go through the pages and pick the pages that are relevant to crime prevention. These selected pages may be part of the training webpages for, by way of example, the crime—non-sensitive subcategory.

Offline extracting component 220 is configured to extract terms and/or phrases from the training webpages. In various embodiments, offline extracting component 220 extracts the terms and phrases for use by offline module 212 in developing a multi-class classifier. More specifically, the terms and phrases extracted by offline extracting component 220 are considered by offline weight computing component 222, which is configured to compute a weight for each of the terms and phrases. In various embodiments, the weight of each term and phrase is computed based upon how many times the term or phrase appears within a webpage. Additionally, in various embodiments, the weight of each term and phrase is computed based upon the location and font of the term or phrase. For example, without limitation, where a term appears a number of times within a webpage, that term may be given a higher weight than a term appearing only once within a webpage. Similarly, by way of example, without limitation, a phrase appearing at the top of a webpage, or a phrase appearing in an alternative font (e.g. larger font, bold, italic, underlined, etc.) may be given a higher weight than a phrase appearing within the body text of the webpage. As will be understood and appreciated by one of ordinary skill in the art, the offline weight computing component 222 is flexible and may be configured to compute weights for various terms and/or phrases based upon the market needs for sensitive webpage content detection engine 204. In various embodiments, by way of example, each webpage may be represented as a vector of terms or phrases and weights. For example, without limitation, each webpage may be represented as: <term1: weight1, term2: weight2, phrase3: weight 3, . . . >.

Offline determining component 224 is configured to determine an association between the terms and/or phrases and the sensitivity categories and is further configured to determine an association between the terms and/or phrases and the sensitivity subcategories. As previously discussed with reference to offline gathering component 218, in various embodiments, the training webpages have already been associated with sensitivity categories and sensitivity subcategories by human reviewers. Thus, in various embodiments, the purpose of offline determining component 224 is to learn associations of terms and/or phrases to each sensitivity category and/or subcategory to develop and multi-class classifier for use with online module 214. In various embodiments, the associations may be interpreted as rules. Thus, in various embodiments, by way of example, offline component 224 is further configured to associate training webpages with sensitivity categories and/or subcategories using rules applied to the term or the phrase. For instance, without limitation, the rule may be: if the term "sex" appears in a webpage more than three times, and the term "nude" appears more than twice, the probability of this webpage belonging to a sex—sensitive subcategory is 0.8. In another example, without limitation, the rule may be: if the term "sex" appears in a webpage more than three times, and the phrase "sex education" appears more than once, the probability of this webpage belonging to a sex—non-sensitive subcategory is 0.9. Thus, as will be understood and appreciated by one of ordinary skill in the art, a logistic regression classifier is built in which these associations are represented as mathematical formulae. For example, without limitation, given a webpage, its probability of belonging to a specific sensitivity category/subcategory may be represented as:

$$\text{Probability(category|webpage)} \sim \exp(X*W)$$

where X is the vector of terms/phrases for the specific webpage and W is the vector of weights of terms/phrases for the specific category. Thus, in this example, given a webpage, the category and/or subcategory with the highest value of Probability (category|webpage) is the predicted category and/or subcategory. As will be understood and appreciated by one of ordinary skill in the art, a multi-class classifier may be created by offline module 212 based upon the association of content in various training webpages. The multi-class classifier created by offline module 212 may be stored, for instance, in association with database 202, and may be used by sensitive webpage content detection engine 204 in conjunction with online module 214.

Having described development of a multi-class classifier to detect webpage content sensitivity with reference to offline module 212, implementing webpage content sensitivity detection will be described herein with reference to online module 214. Online module 214 is configured to analyze one or more webpages and to predict a sensitivity level associated with the webpage content of the one or more webpages. Online module 214 includes online receiving component 226, online extracting component 228, online weight computing component 230, online probability computing component 232, and online sensitivity prediction component 234. In various embodiments, online module 214 uses the multi-class classifier created by offline module 212, allowing sensitive webpage content detection engine 204 to predict the sensitivity of content associated with various webpages.

Online receiving component 226 is configured to receive one or more webpages. In various embodiments, the webpages may include various types of content. By way of example, without limitation, the webpage may be a news article, a page of a personal website, or a page of a website operated by a business. One of ordinary skill in the art will understand and appreciate that various types of webpages may be received by online receiving component 226. By way of further example, without limitation, the webpage may be a page from a blog or an online forum.

Online extracting component 228 is configured to extract terms and/or phrases from the webpage content of the one or more webpages received by online receiving component 226. In various embodiments, online extracting component 228 may function similarly to offline extracting component 220 discussed previously. More specifically, the terms and phrases extracted by online extracting component 228 may be considered by online weight computing component 230 (which also may function similarly to offline weight computing component 222), which is configured to compute a weight for each of the terms and/or phrases. In various embodiments, for example, the weight of each term and phrase may be computed based upon how many times the term and/or phrase appears within a webpage. Additionally, in various embodiments, the weight of each term and/or phrase is computed based upon the location and font of the term and/or phrase. For example, without limitation, where a term appears a number of times within a webpage, that term may be given a higher weight than a term appearing only once within a webpage. Similarly, by way of example, without limitation, a phrase appearing at the top of a webpage, or a phrase appearing in an alternative font (e.g. larger font, bold, italic, underlined, etc.) may be given a higher weight than a phrase appearing within the body text of the webpage. As will be understood and appreciated by one of ordinary skill in the art, the offline weight computing component 222 is flexible and may be configured to compute weights for various terms and/or phrases based upon the market needs for sensitive webpage content detection engine 204. In various embodiments, by way of example, each webpage may be represented as a vector of terms or phrases and weights. For example, without limitation, each webpage may be represented as: <term1: weight1, term2: weight2, phrase3: weight 3, . . . >.

Online probability computing component 232 is configured to compute an association probability between the one or more webpages received by online receiving component 226 and the one or more sensitivity categories and/or subcategories defined by offline defining component 216 of offline module 212. In various embodiments, online probability computing component 232 uses the multi-class classifier developed by offline module 212 to compute the probability of the received page belonging to each sensitivity category and/or sensitivity subcategory. Online sensitivity prediction component 234 is configured to associate each of the one or more webpages with at least one predicted sensitivity category and/or subcategory. In various embodiments, without limitation, the category and/or subcategory with the highest probability will be the predicted category or subcategory. Further, in various embodiments, online sensitivity prediction component 234 is configured to provide a confidence score. For example, without limitation, the confidence score may be the probability value of the predicted category and/or subcategory.

It will be understood and appreciated by those of ordinary skill in the art that additional components not shown may also be included within any of system 200, database 202, sensitive webpage content detection engine 204, and user interface 208.

Figure 3:
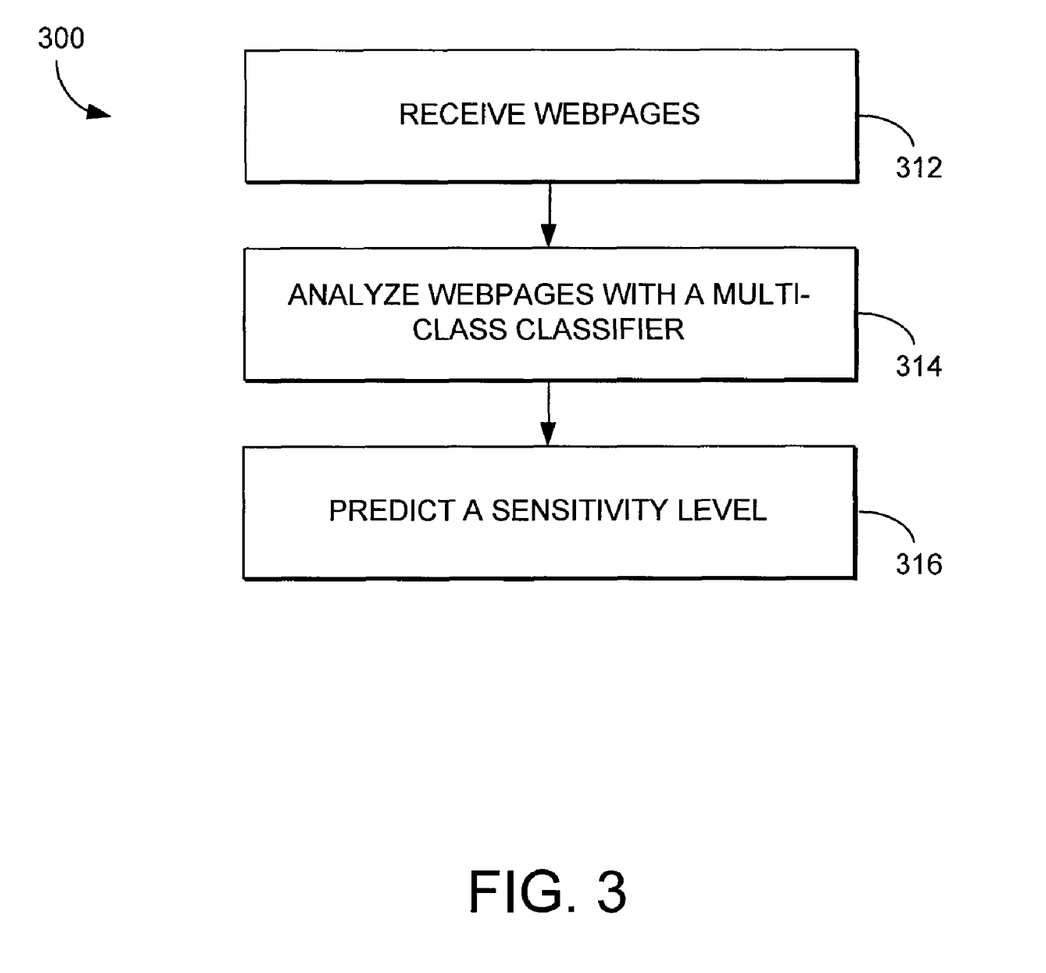
FIG. 3 is a flow diagram illustrating an exemplary method for sensitive webpage content detection, in accordance with an embodiment of the present invention.

Turning now to FIG. 3, a flow diagram of an exemplary method for sensitive webpage content detection, in accordance with an embodiment of the present invention, is illustrated and designated generally as reference numeral 300. Initially, as indicated at block 312, webpages are received, e.g., by receiving component 226 of online module 214 of FIG. 2. As previously discussed with reference to FIG. 2, the received webpages may be various type of webpages. For instance, without limitation, the received webpages may be a news article, a page from a personal website, a page from a business website, a blog page, or a forum page, among others. Various types of webpages are contemplated and within the scope of the present invention.

Next, as indicated at block 314, webpages are analyzed with a multi-class classifier, e.g., by online module 214 of FIG. 2. In various embodiments, without limitation, terms and/or phrases are extracted from the webpages, e.g., by online extracting component 228 of FIG. 2, for analysis. Analysis may include, in various embodiments, weighing the various terms and/or phrases, e.g., with online weight computing component 230, and determining the probability that the webpages are associated with each category and/or subcategory of the multi-class classifier, e.g., with online probability computing component 232 of FIG. 2. Thus, as will be understood and appreciated by one of ordinary skill in the art, webpages are analyzed according to the content within the webpage (as opposed to being analyzed by the www address associated with the URL or the name of the page).

Next, as indicated at block 316, a sensitivity level is predicted, e.g., by online sensitivity prediction component 234 of online module 214 of FIG. 2. In various embodiments, without limitation, the sensitivity level is predicted using sensitivity categories and/or sensitivity subcategories, e.g., the categories defined by offline defining component 216 of FIG. 2. The sensitivity category and/or sensitivity subcategory with the highest probability associated with each webpage may be the predicted category and/or subcategory in various embodiments. For example, without limitation, where an analyzed webpage includes content indicating a highest probability that the content is associated with a crime—sensitive subcategory, the sensitivity level of the webpage will be predicted as crime—sensitive. One of ordinary skill in the art will understand and appreciate that the sensitivity categories and/or subcategories discussed herein are not limited to a category/subcategory configuration. For example, without limitation, various embodiments of the present invention may only have categories and not have any subcategories. Further, by way of example, without limitation, one of ordinary skill in the art will understand and appreciate can be used by advertisers to tailor advertising based upon webpage content. For instance, an advertiser may have an online content-based advertisement scheme that targets consumers based upon webpage content. The advertiser, however, may wish to maintain a particular image and may not want to be associated with webpages displaying certain content, such as sex. Using the sensitivity level, the advertiser can ensure that its advertisements are not displayed in association with any webpage having inappropriate sexual content. Thus, in this example, the advertiser can avail itself of the benefits of content-based advertising while maintaining the image it desires.

Figure 4:
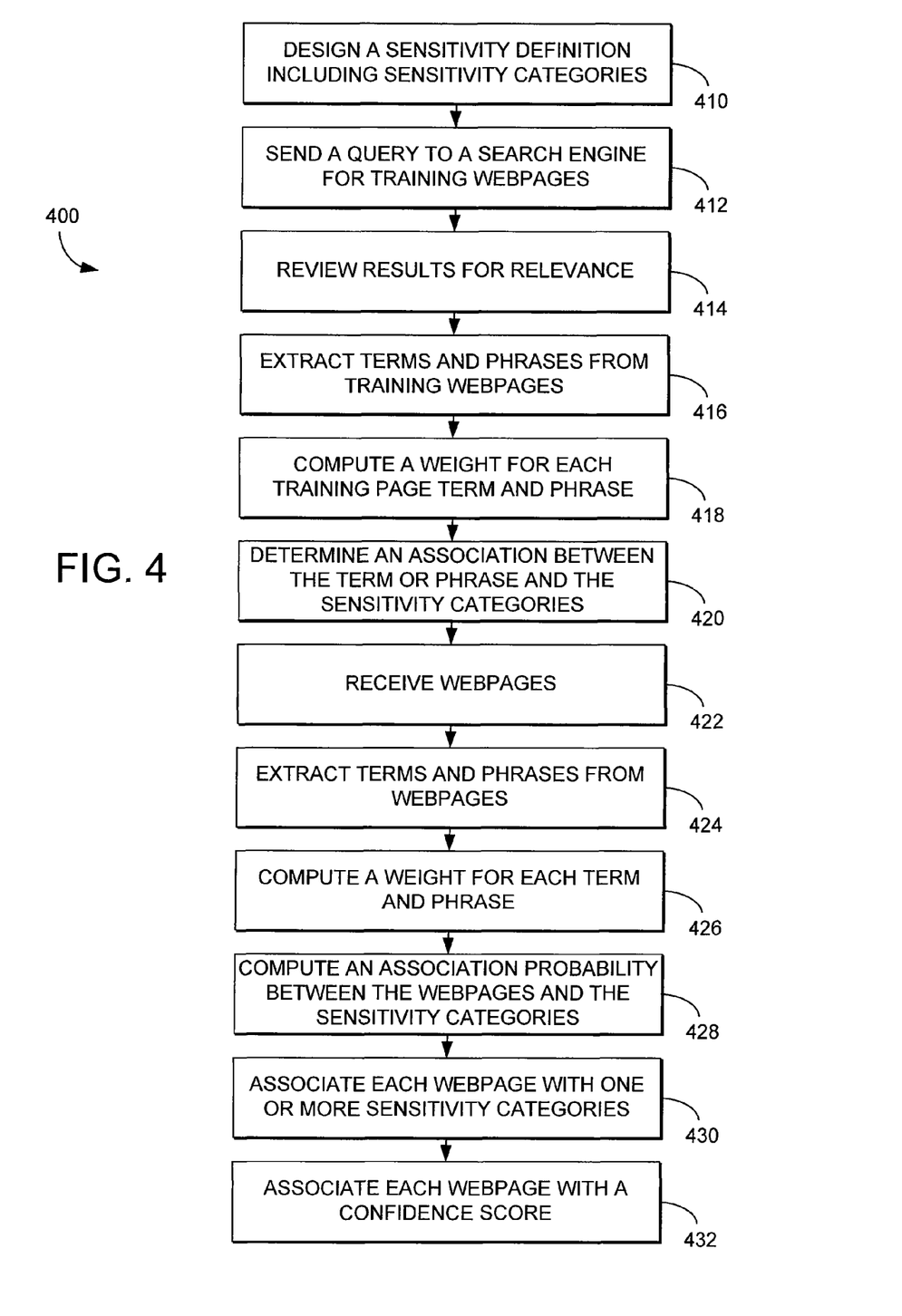
FIG. 4 is a flow diagram illustrating an exemplary method for sensitive webpage content detection, the method having more detail than the method of FIG. 3, in accordance with an embodiment of the present invention.

Turning now to FIG. 4 a flow diagram of an exemplary method for sensitive webpage content detection, the method having more detail than the method of FIG. 3, in accordance with an embodiment of the present invention, is illustrated and designated generally as reference numeral 400. Initially, as indicated at block 410, a sensitivity definition including sensitivity categories is designed, e.g., by offline defining component 216 of offline module 212 of FIG. 2. As previously stated with reference to FIG. 2, in various embodiments, sensitivity categories may be created based upon potentially sensitive webpage content. In various embodiments the sensitivity categories are dynamic. For instance, without limitation, the sensitivity categories may be expanded to include more content or contracted to be less sensitive based upon business interests of a customer. Further, by way of example, without limitation, sensitivity categories may be added or removed and subcategories may be created for some or all of the sensitivity categories.

Next, as indicated at block 412, a query is sent to a search engine for training webpages, e.g., by gathering component 218 of offline module 212 of FIG. 2. In various embodiments, training webpages are used during the development of the multi-class classifier and, therefore, training webpages should be of a type associated with on or more of the defined sensitivity categories. By way of example, without limitation, where one of the sensitivity categories is crime, a search query of crime may be submitted and the top 500 returned results may be used as training webpages.

Next, as indicated at block 414, the query results are reviewed for relevance, e.g., by offline gathering component 218 of offline module 212 of FIG. 2. In various embodiments, relevance is used to determine whether a webpage would be appropriately associated with one or more of the defined categories. By way of example, without limitation, if the webpage is not relevant to the sensitivity categories, it may be of minimal value during development of the multi-class classifier. In various embodiments, the association between the training webpages and the sensitivity categories is determined by human reviewers. Stated differently, by way of example, without limitation, the training webpages association with the categories is known prior to steps 416, 418, and 420 described herein. Thus, in various embodiments, with a known association between the training webpages and the sensitivity categories, content information from the training websites is extracted and analyzed in order to develop a model multi-class classifier.

Next, as indicated at block 416, terms and phrases are extracted from the training webpages, e.g., by offline extracting component 220 of offline module 212 of FIG. 2. As previously stated, in various embodiments, this content information is used to develop a multi-class classifier. Next, as indicated at block 418, a weight is computed for each term and/or phrase, e.g., by offline weight computing component 222 of offline module 212 of FIG. 2. As previously stated, in various embodiments, the weight for each term and/or phrase may be computed based upon the frequency of the term and/or phrase in the webpage and may also be based upon the size and font of the term and/or phrase. Next, as indicated at block 420, an association is determined between the term and/or phrase and the sensitivity categories, e.g., by offline determining component 224 of offline module 212 of FIG. 2. As previously stated, in various embodiments, the association between the term and/or phrase and the sensitivity categories is used to develop a model multi-class classifier. For example, using the associations, rules may be created for the multi-class classifier for use by, e.g., online module 214 of FIG. 2. One of ordinary skill in the art will understand and appreciate that rules may involve various properties including, without limitation, the frequency of terms or phrases in a webpage, their correlation to other terms and/or phrases, their size and font, etc. Various combinations of rules using webpage content information in association with sensitivity categories are contemplated and within the scope of the present invention.

Next, as indicated at block 422, webpages are received, e.g., by online receiving component 226 of online module 214 of FIG. 2. As previously stated, in various embodiments, various types of webpage and webpage content are contemplated and within the scope of the present invention. Next, as indicated at block 424, terms and phrases are extracted from the webpages, e.g., by online extracting component 228 of online module 214 of FIG. 2. In various embodiments, the terms and/or phrases may be extracted from the webpage content in a similar manner to block 416 discussed previously. In various embodiments, without limitation, not every term and/or phrase in the webpage is extracted. For instance, without limitation, in various embodiments only the terms relevant to the defined sensitivity categories may be extracted. Various levels of term and/or phrase extraction are contemplated and within the scope of the present invention. Next, as indicated at block 426, a weight is computed for each term and phrase, e.g., by online weight computing component 230 of online module 214 of FIG. 2. In various embodiments, the terms and/or phrases may be weighted in a manner similar to block 418 discussed previously.

Next, as indicated at block 428, an association probability is computed between the webpages and the sensitivity categories, e.g., by online probability computing component 232 of online module 214 of FIG. 2. As previously stated with reference to FIG. 2, in various embodiments the association probability may be computed using a set of pre-defined rules in the multi-class classifier. Next, as indicated at block 430, each webpage is associated with one or more sensitivity categories and, as indicated at block 432, each webpage is associated with a confidence score, e.g., by online sensitivity prediction component 234 of online module 214 of FIG. 2. As previously stated with reference to FIG. 2, the predicted associated sensitivity category may be, in various embodiments, the sensitivity category with the highest association probability. Further, in various embodiments, the confidence score may be the normalized association probability for the sensitivity category.

Figure 5:
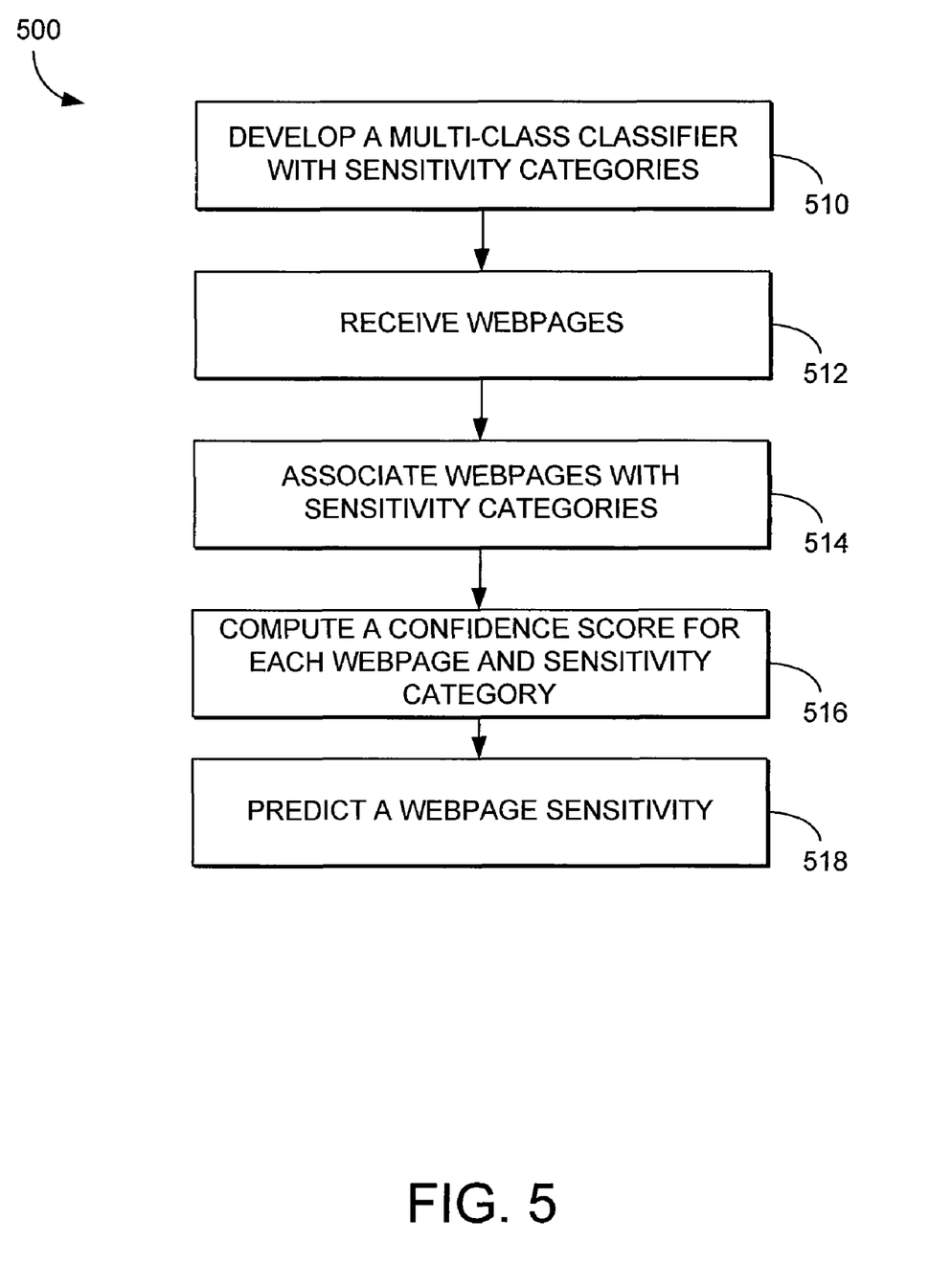
FIG. 5 is a flow diagram illustrating an exemplary method for sensitive webpage content detection utilizing sensitivity categories, in accordance with an embodiment of the present invention.

Turning now to FIG. 5, a flow diagram of an exemplary method for sensitive webpage content detection utilizing sensitivity categories, in accordance with an embodiment of the present invention, is illustrated and designated generally as reference numeral 500. As previously discussed with reference to FIG. 3, a multi-class classifier is developed at block 510 and webpages are received at block 512. In various embodiments, without limitation, the multi-class classifier includes sensitivity categories. Further, as previously discussed with reference to FIG. 4, webpages are associated with sensitivity categories at block 514 and a confidence score is computed for each webpage and its corresponding one or more sensitivity categories at block 516. Using the association information between the webpage and the one or more sensitivity categories, combined with the confidence score computed for each webpage, a webpage sensitivity is predicted at block 518. One of ordinary skill in the art will understand and appreciate that in various embodiments, based upon the confidence score, it is determined whether or not to deliver an advertisement to a webpage. For instance, without limitation, even where a webpage is categorized into a sensitive category, if the confidence score associated with the sensitivity is sufficiently low (depending upon business circumstances and market desires), an advertisement may still be displayed.

In each of the exemplary methods described herein, various combinations and permutations of the described blocks or steps may be present and additional steps may be added. Further, one or more of the described blocks or steps may be absent from various embodiments. It is contemplated and within the scope of the present invention that the combinations and permutations of the described exemplary methods, as well as any additional or absent steps, may occur. The various methods are herein described for exemplary purposes only and are in no way intended to limit the scope of the present invention.

The present invention has been described herein in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain the ends and objects set forth above, together with other advantages which are obvious and inherent to the methods, computer-readable media, and graphical user interfaces. It will be understood that certain features and sub-combinations are of utility and may be employed without reference to other features and sub-combinations. This is contemplated by and within the scope of the claims.

The invention claimed is:

1. A computer-implemented method for sensitive webpage content detection, comprising:
   developing a multi-class classifier with one or more business sensitivity categories, the development of the multi-class classifier including:
      designing a sensitivity definition including one or more business sensitivity categories and one or more business sensitivity subcategories;
      gathering one or more training webpages for each of the one or more business sensitivity categories and the one or more business sensitivity subcategories; and
      building a logistical regression model to associate one or more terms and/or phrases with each of the one or more business sensitivity categories and the one or more business sensitivity subcategories;
   receiving one or more webpages with webpage content;
   analyzing the one or more webpages with the multi-class classifier, including:
      extracting at least one of a term and a phrase from the webpage content of the one or more webpages;
      computing a weight for each extracted term or phrase;
      computing an association probability between the one or more webpages and one or more business sensitivity categories and/or business sensitivity subcategories, based in part on the computed weight for one or more extracted terms or phrases;
   computing a confidence score based upon the association probability between the one or more webpages and the one or more business sensitivity categories;
   predicting a business sensitivity level associated with the webpage content of the one or more webpages, the predicted sensitivity level for at least one of the one or more webpages being greater than a threshold value for at least one business sensitivity category or business sensitivity subcategory;
   receiving a request for a webpage that contains webpage content having a predicted sensitivity level greater than the threshold value for the at least one business;
   displaying the webpage content of the requested webpage;
   identifying one or more advertisements that are not suitable for display based on the one or more advertisements being associated with the at least one business sensitivity category or business sensitivity subcategory for which the predicted sensitivity level of the webpage content is greater than the threshold value; and
   modifying the requested webpage to include at least one advertisement, the at least one advertisement being different from the identified advertisements.

2. The method of claim 1, wherein building a logistical regression model comprises:
   extracting at least one of a term and a phrase from the one or more training webpages;
   computing a weight for each of the at least one of a term and a phrase;
   determining an association between the at least one of a term and a phrase and the one or more business sensitivity categories and/or business sensitivity subcategories; and
   determining an association between the at least one of a term and a phrase and the one or more business sensitivity categories and/or business sensitivity subcategories.

3. The method of claim 2, wherein the weight for each of the at least one of a term and a phrase is computed based upon at least one of the frequency, location, and font of the at least one of a term and a phrase within each of the one or more training webpages.

4. The method of claim 3, wherein the one or more training webpages are associated with at least one of the one or more sensitivity categories and the one or more sensitivity subcategories based upon a probability determination.

5. The method of claim 1, wherein gathering one or more training webpages for each of the one or more business sensitivity categories and/or the one or more business sensitivity subcategories comprises:
   sending a query to a search engine; and
   reviewing one or more results returned by the search engine for relevance,
   wherein reviewing one or more results returned by the search engine for relevance is done by one or more human reviewers.

6. The method of claim 1, wherein the weight for each of the at least one of a term and a phrase is computed based upon at least one of the frequency, location, and font of the at least one of a term and phrase within the webpage content of the one or more webpages.

7. The method of claim 1, wherein predicting a business sensitivity level associated with the webpage content of the one or more webpages comprises:
   associating each of the one or more webpages with at least one predicted category,
   wherein the at least one predicted category is at least one of the one or more business sensitivity categories and the one or more business sensitivity subcategories.

8. One or more computer storage hardware media having instructions embodied thereon that, when executed, perform a method for sensitive webpage content detection, the method comprising:
   developing a multi-class classifier with one or more business sensitivity categories, the development of the multi-class classifier including:
      designing a sensitivity definition including one or more business sensitivity categories and one or more business sensitivity subcategories;
      gathering one or more training webpages for each of the one or more business sensitivity categories and the one or more business sensitivity subcategories; and
      building a logistical regression model to associate one or more terms and/or phrases with each of the one or more business sensitivity categories and the one or more business sensitivity subcategories;
   receiving one or more webpages with webpage content;
   associating the one or more webpages with one or more of the one or more business sensitivity categories by computing an association probability between the one or more webpages and the one or more business sensitivity categories;
   computing a confidence score based upon the association probability between the one or more webpages and the one or more business sensitivity categories;
   predicting a webpage business sensitivity for the one or more webpages, the webpage business sensitivity for at least one of the webpages being greater than a threshold value for at least one business sensitivity category or business sensitivity subcategory;

receiving a request for a webpage having a predicted business sensitivity level greater than the threshold value for the at least one business sensitivity category or business sensitivity subcategory;

displaying the webpage content of the requested webpage;

identifying one or more advertisements that are not suitable for display based on the one or more advertisements being associated with the at least one business sensitivity category or business sensitivity subcategory for which the predicted sensitivity level of the requested webpage is greater than the threshold value; and displaying an advertisement responsive to the webpage request without displaying the identified one or more advertisements.

* * * * *